Nov. 12, 1935.  G. E. SMITHBURN  2,020,524
TILLAGE IMPLEMENT
Filed May 9, 1934 3 Sheets-Sheet 1
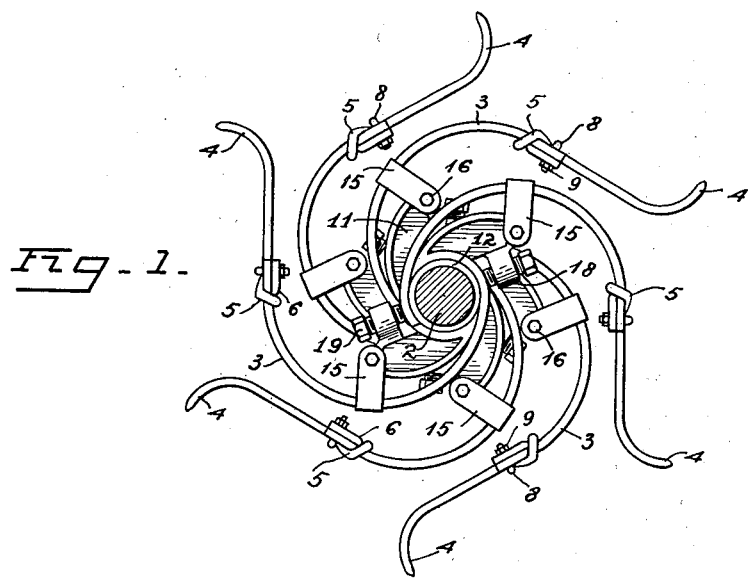
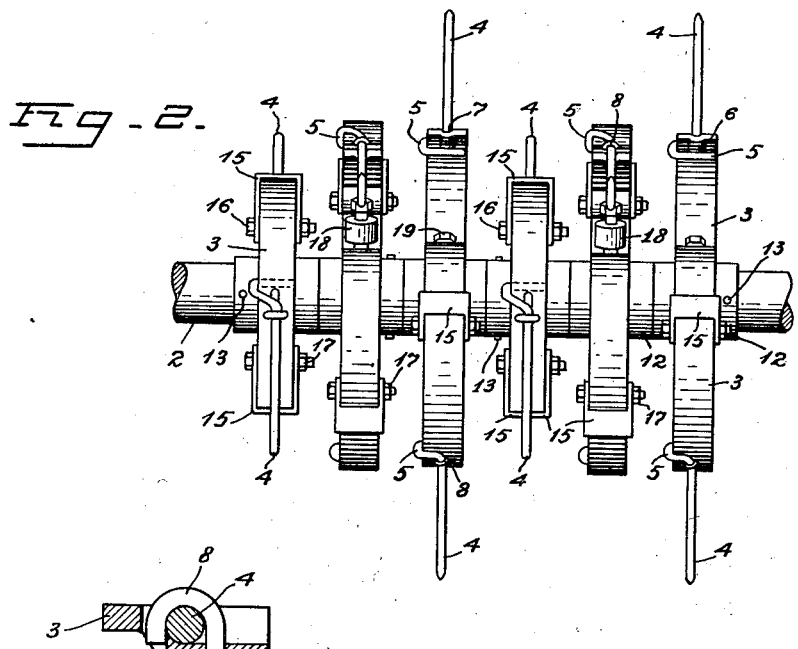
INVENTOR.
GEORGE E. SMITHBURN
BY Charles O. Bruce
ATTORNEY

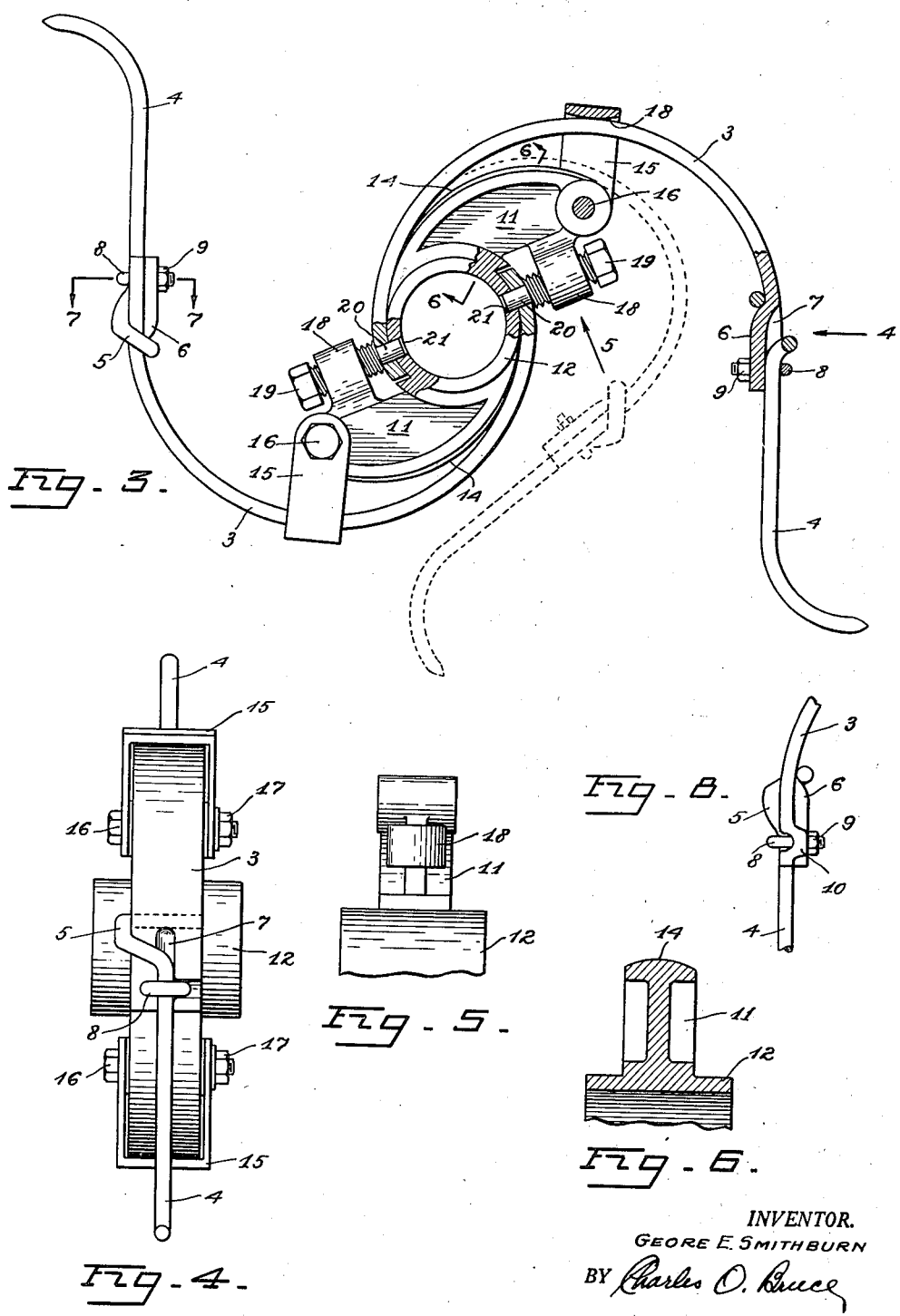

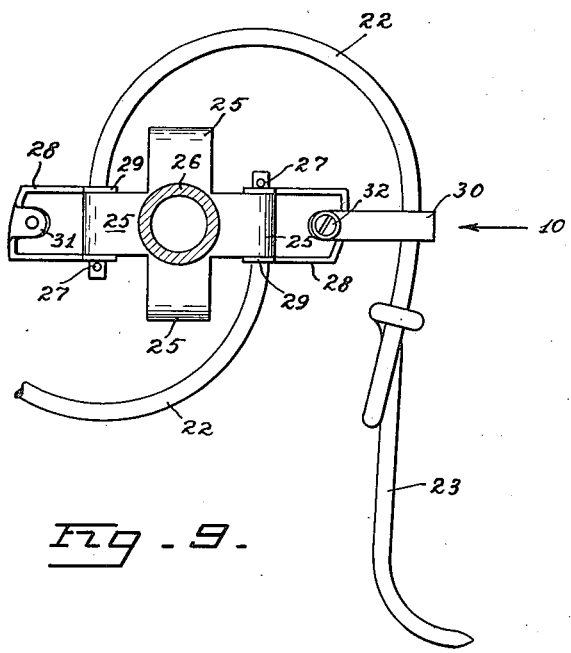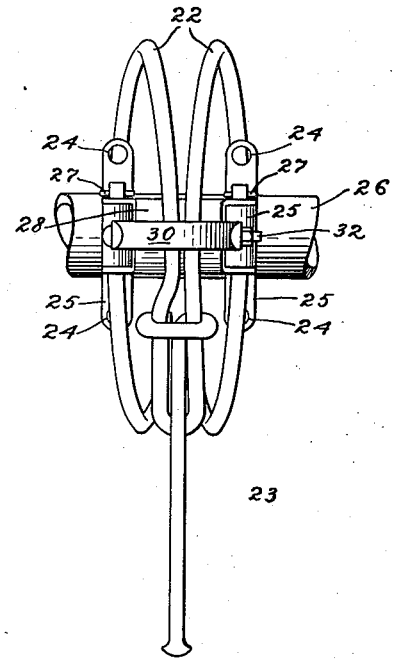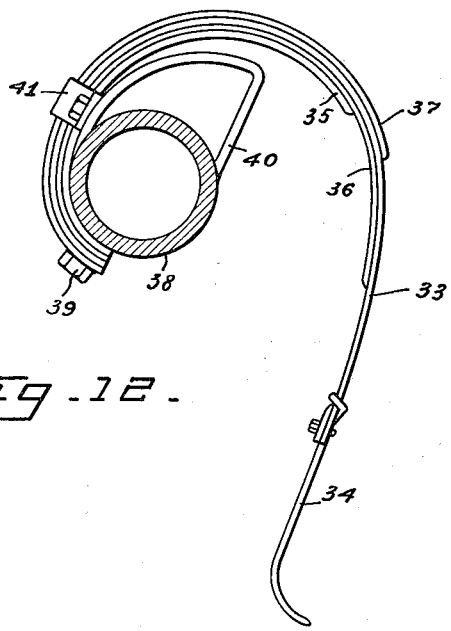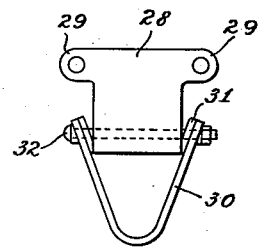

Patented Nov. 12, 1935

2,020,524

UNITED STATES PATENT OFFICE 2,020,524

TILLAGE IMPLEMENT

George E. Smithburn, Berkeley, Calif.

Application May 9, 1934, Serial No. 724,655

13 Claims. (Cl. 97—216)

My invention relates to tillage implements, and more particularly to tillage implements of the rotary type employing a resilient arm.

Implements of the type to which my invention pertains are characterized by the employment of a rotatable shaft on which are mounted resilient arms or spring teeth for breaking up and cultivating the soil. These arms or teeth are obviously subjected to drastic flexings, not only upon encountering obstructions in the soil but also upon their release therefrom and from the soil upon normal rotation of the shaft, with the result that the metal becomes fatigued and breakage occurs. This breakage obviously increased the cost of operation of the implement through excessive replacements and tie-up of the device. My invention on the other hand overcomes these objections by a novel arrangement of parts and the employment of structure for determining the flexure of that portion of the arm or tooth in which fatigue and breakage have heretofore occurred.

It is, therefore, an important object of my invention to provide a tillage implement that will withstand extended and severe usage.

Another object of my invention is to provide a tillage implement employing a flexible arm wherein the flexure of the proximal portion thereof is constrained within predetermined limits.

A further object of my invention is the provision of a tillage implement in which parts may be quickly removed and replaced without causing undue tie-up of the device.

An additional object of my invention is the provision of a tillage implement of the character described, composed of few and simple parts, and which can be economically manufactured and assembled.

Other objects and advantages of my invention will be apparent from a perusal of the following description forming a part of this specification, but I do not limit myself to the embodiment of the invention herein described, as various forms may be adapted within the scope of the claims.

Referring to the drawings:

Figure 1 is a transverse sectional view of a tillage implement assembly, employing one form of my invention, wherein the tillage arms and mounting structure are disposed in units about the shaft.

Figure 2 is a longitudinal view of the assembly shown in Figure 1.

Figure 3 is an elevational view, partly in section, of one of the units shown in Figure 1, one of the arms being shown in dotted lines to illustrate the position taken thereby when the curvature of such arm is increased during operation.

Figure 4 is an elevational view of the structure illustrated in Figure 3, looking in the direction indicated by arrow 4 of Figure 3.

Figure 5 is an elevational view of the abutment structure shown in Figure 3, looking in the direction of arrow 5 of Figure 3, a portion of the hub being broken away.

Figure 6 is a transverse sectional view of said abutment taken in a plane indicated by line 6—6 of Figure 3.

Figure 7 is a transverse sectional view of the tine and arm connection taken in a plane indicated by line 7—7 of Figure 3.

Figure 8 is a fractional elevational view, illustrating how the tine is attached to the arm.

Figure 9 is an elevational view similar to Figure 3 of another embodiment of my invention.

Figure 10 is an elevational view of the modified structure shown in Figure 9, looking in the direction indicated by arrow 10 of such figure, a portion of the hub, however, being broken away.

Figure 11 is an elevational view of the abutment and arm restraining yoke as employed in the embodiment illustrated in Figures 9 and 10.

Figure 12 is an elevational view similar to Figures 3 and 9 of still another embodiment of my invention.

In terms of broad inclusion, my tillage implement comprises a rotatable shaft to which is connected, for rotation therewith, a resilient or flexible arm. This arm projects radially from the shaft and is preferably provided with a removable tine or cutting tool of wear resisting material adapted to enter the earth or soil on rotation of the shaft. Abutment means is provided for constraining the flexure of the proximal portion of the arm as the arm is flexed by contact with the earth and a restraining yoke or snubber is provided to check or snub the arm as it rebounds, upon release from the soil.

My invention may be more fully understood by detailed reference to the drawings, attention being first directed to the embodiment shown in Figures 1 through 8. Here a rotatable shaft 2 is provided which carries the outwardly extending tillage arm 3 preferably formed of flat resilient material such as spring steel and provided at its outer or distal end with a detachable tine or cutting tool 4. This tine is preferably made of wear resisting material such as tempered steel the better to withstand abrasive wear resulting from contact with the earth. I prefer that the arm and tine shall extend outwardly from the shaft in a curved path in order to facilitate the entry of the tine into the earth upon rotation of the shaft, thus improving the operation of the device.

To facilitate removal and replacement of tine 4, I prefer to form one end of the tine (see Figures 3, 4, and 8) with a partial loop 5 which may be slipped over the distal end of the arm. The arm in turn, adjacent its distal end, is depressed to provide on one side a shoulder 6 against which the loop 5 is adapted to abut and a seat or channel 7 on the other side in which the tine, adjacent its loop 5, may rest. Arm 3 adjacent opposite sides of channel 7 is apertured to receive the U-shaped clip 8, one arm of which is threaded to receive nut 9. This nut is adapted to bear upon shoulder 10 formed in arm 3 as illustrated in Figures 7 and 8. It is obvious that the lock nut as it is threaded on the clip bears upon shoulder 10 and draws the clip toward the arm thus firmly seating and securing the tine on the arm. While only one form of tine is shown, it is apparent that various shapes and sizes of tines or cutting tools may be employed to meet the various needs of the user, all without changing the form of attachment. It is also apparent that the tine as a separate element and its associated attachment structure may be dispensed with by simply forming both arm and tine from a single strip of material.

Means is provided for determining the curvature of the proximal portion of arm 3 when the curvature thereof is increased by contact with the earth. This means comprises preferably an abutment 11 having a hub 12 secured to the shaft 2 by means of set screws or pins 13. Abutment 11 rises arcuately from the hub (see Figure 3) so as to progressively engage the proximal portion of arm 3 as the same is flexed by contact with the earth, thus gauging the maximum curvature thereof. During operation of the device it is obvious that soil will find its way between the outer face 14 of the abutment 11 and arm 3, therefore, to avoid the collection and compaction of such soil therebetween and to facilitate its escape, face 14 of the abutment is crowned transversely as shown in Figure 6.

In the embodiment illustrated in the first eight figures, a pair of arms and abutments are carried by a single hub and form a unitary structure. Each abutment 11 in such case is preferably provided with an apertured ear 18 for receiving the threaded bolt 19. This bolt is formed with an end portion 20 of reduced diameter which is adapted to pass through an appropriate aperture in the arm whose flexure is restrained by the opposite abutment and into the hole 21 in the hub. It will be observed upon reference to Figure 3 that the advancement of bolt 19 on its threads will firmly attach arm 3 to hub 12 and consequently shaft 2, and that the removal or replacement of said arm may be simply and speedily accomplished by the mere manipulation of such bolt.

For checking or snubbing the rebound of arm 3, upon its release from the soil on rotation of the shaft, a yoke 15 is provided which is preferably removably secured to the outer end of abutment 11 by means of the bolt 16 held in place by lock nut 17. It will be observed that the inner face 18 of yoke 15 is crowned similarly to abutment face 14 and for the same reason.

It is to be noted that a plurality of the unitary structures shown in Figures 3 and 4 may be easily and quickly mounted on a common shaft to form a tillage assembly such as illustrated in Figures 1 and 2. The two arms of each unit in such assembly may be secured in staggered relation with those of the adjacent unit by merely tightening the set screws or pins 13 upon the shaft, while the space between the arms will be quickly and accurately gauged by bringing the adjacent ends of the hubs 12 into abutting relation.

The embodiment shown in Figures 9 and 10 differs mainly from the one first described in the character of arm and abutment structure employed. Here the arm 22 is made preferably of a rod of spring steel bent backwardly upon itself to provide a loop at its distal end in which tine 23 is threaded. The ends of the rod forming the proximal portion of arm 22 are secured in apertures 24 formed in two sets of oppositely disposed radially extending lugs 25 preferably cast integral with hub 26; and to restrain the withdrawal of the arm from the lugs, pins 27 are provided.

An abutment 28, U-shaped in transverse cross section is provided for constraining the flexure of the proximal portion of arm 22. The legs of this abutment are formed with apertured tongues 29 (see Figure 11), the apertures being so spaced apart as to match the apertures 25 in the oppositely disposed sets of lugs 25, also, the legs of the abutment are so spaced as to span the width of the lugs 25, as illustrated in Figure 9, and when so positioned the abutment may be securely fastened to the lugs by inserting the ends of arms 22 through the matching apertures.

For dampening or snubbing the rebound of arm 22 upon its release from the earth, yoke 30, secured to the inturned apertured ears 31 of abutment 28 by means of the bolt 32, is provided.

It will be observed that only two sets of lugs 25 are utilized in the two armed units shown in Figures 9 and 10, although four sets are provided. It is obvious, however, that upon collecting a plurality of such units in a tillage assembly of the general character illustrated in Figure 2, the free lugs 25 in adjacent units may be employed for receiving and supporting additional arms and abutment structures.

In the third embodiment illustrated in Figure 12, a curved tillage arm 33 with attached tine 34 is utilized and the same is provided along its proximal portion with laminae 35, 36 and 37, for constraining the flexure thereof. Laminae 35 and 36 support the arm and yieldably restrain the curvature thereof as such curvature is increased by contact of the tine with the earth. Lamina 37, on the other hand, serves to restrain and dampen the rebound of the arm as the tine leaves the earth. Of course, it is obvious that any number of laminae may be used to suit the requirements of the user. The laminated portion of arm 33 is secured to a hub 38 by means of a bolt 39. An abutment 40 carried by the hub rises arcuately therefrom and limits the curvature of the laminated portion of the arm as the same is increased by contact of the tine with the earth. To limit the rebound of the laminated arm, a yoke 41 is provided which is suitably secured to the abutment.

I claim:

1. A tillage implement comprising in combination, a shaft adapted to be rotated, a flexible arm connected to said shaft and having its distal end adapted to enter the earth on rotation of said shaft, and means for constraining the flexure of the proximal portion of said arm in an arcuate plane disposed radially from, and substantially tangent with, said shaft when said arm is flexed by contact with the earth.

2. A tillage implement comprising in combination, a shaft adapted to be rotated, a flexible arm connected to said shaft and having its distal end adapted to enter the earth on rotation of said shaft, and abutting means connected to said shaft and having a peripheral portion adapted to progressively engage the proximal portion of said arm when said arm is flexed by contact with the earth, said peripheral portion having a curvature lying in an arcuate plane disposed substantially tangent with said shaft.

3. A tillage implement comprising in combination, a shaft adapted to be rotated, a resilient arm connected to said shaft extending outwardly in a curved path and having its distal end adapted to enter the earth on rotation of said shaft, and means for determining the curvature of the proximal portion of said arm when the curvature thereof is increased by contact with the earth, said means comprising an abutment disposed adjacent said arm and having a peripheral portion adapted to be engaged by said arm when flexed, said peripheral portion having a curvature progressively increasing therealong radially from the axis of the shaft.

4. A tillage implement comprising in combination, a shaft adapted to be rotated, a resilient arm connected to said shaft extending outwardly in a curved path and having its distal end adapted to enter the earth on rotation of said shaft, means for determining the curvature of the proximal portion of said arm when the curvature thereof is increased by contact with the earth, and means for limiting the opening of said curvature when said arm is released from contact with the earth on the rotation of said shaft.

5. A tillage implement comprising in combination, a shaft adapted to be rotated, a resilient arm connected to said shaft extending outwardly in a curved path, a tine removably secured to the distal end of said arm and adapted to enter the earth on rotation of said shaft, means for determining the curvature of the proximal portion of said arm when the curvature thereof is increased by contact of said tine with the earth, and means for limiting the opening of said curvature when said tine is released from contact with the earth on rotation of said shaft.

6. A tillage implement comprising in combination, a shaft adapted to be rotated, a resilient arm connected to said shaft extending outwardly in a curved path, a tine removably secured to the distal end of said arm and adapted to enter the earth on rotation of said shaft, a radially disposed arcuate abutment mounted for rotation with said shaft and adapted to constrain the curvature of the proximal portion of said arm when the curvature thereof is increased by contact of said tine with the earth, and means for limiting the opening of said curvature when said tine is released from contact with the earth on rotation of said shaft.

7. A tillage implement comprising in combination, a shaft adapted to be rotated, a resilient arm connected to said shaft extending outwardly in a curved path, a tine removably secured to the distal end of said arm and adapted to enter the earth on rotation of said shaft, a radially disposed arcuate abutment mounted for rotation with said shaft and adapted to constrain the curvature of the proximal portion of said arm when the curvature thereof is increased by contact of said tine with the earth, and a yoke carried by said abutment for limiting the opening of said curvature when said tine is released from contact with the earth on rotation of said shaft.

8. A tillage implement comprising in combination, a shaft adapted to be rotated, a hub surrounding said shaft and rotatable therewith, a flexible arm attached to said hub extending outwardly in a curved path and having its distal end adapted to enter the earth on rotation of said shaft, and an arcuate abutment having a peripheral portion adapted to be engaged by said arm when flexed and disposed in an arcuate plane extending radially from, and tangent with, said shaft, disposed on said hub for determining the curvature of the proximal portion of said arm when the curvature thereof is increased by contact with the earth.

9. A tillage implement comprising in combination, a shaft adapted to be rotated, a hub surrounding said shaft and rotatable therewith, a plurality of flexible arms radially disposed about said hub and having their distal ends adapted to enter the earth on rotation of said hub, a plurality of abutments each having a peripheral portion adapted to be engaged by an arm when flexed and disposed in an arcuate plane extending radially from, and tangent with, said shaft, disposed on said hub and adapted to determine the curvature of the proximal portion of said arms when the curvature thereof is increased by contact with the earth, and means for removably securing said arms to said hub.

10. A tillage implement comprising in combination, a shaft adapted to be rotated, a flexible arm connected to said shaft extending outwardly in a curved path and having its distal end adapted to enter the earth on rotation of said shaft, means associated with said arm for yieldably supporting the proximal portion thereof, and means disposed on said shaft for determining the maximum curvature of the proximal portion of said arm when the curvature thereof is increased by contact with the earth, said means comprising an abutment disposed adjacent said arm and having a peripheral portion adapted to be engaged by said arm when flexed, said peripheral portion having a curvature progressively increasing therealong radially from the axis of the shaft.

11. A tillage implement comprising in combination, a shaft adapted to be rotated, a flat flexible arm connected to said shaft extending outwardly in a curved path and having its distal end adapted to enter the earth on rotation of said shaft, laminae on the proximal portion of said arm for yieldably supporting said arm, and abutment means disposed on said shaft for determining the maximum curvature of the laminated portion of said arm when said curvature is increased by the contact of said arm with the earth.

12. A tillage implement comprising in combination, a shaft adapted to be rotated, a resilient arm connected to said shaft extending outwardly in a curved path and having a tine on its distal end adapted to enter the earth on rotation of said shaft, said arm comprising a rod bent backwardly upon itself, abutment means disposed on said shaft for constraining the curvature of said arm when said curvature is increased by the contact of said tine with the earth, and a yoke disposed on said abutment means for constraining the normal opening of said curvature.

13. A tillage implement comprising, in combination, a shaft adapted to be rotated, a hub surrounding said shaft and rotatable therewith, said hub having a peripheral portion provided with an aperture and extending in an arcuate plane radially from, and substantially tangent with, said shaft, a lug secured to said hub and having a threaded aperture therein in axial alinement with the aperture of said peripheral portion, a flexible arm disposed to lie on said peripheral portion and having an aperture adjacent an end thereof in registry with the aperture in said peripheral portion and the aperture in said lug, and a screw passing through each of said apertures.

GEORGE E. SMITHBURN.